United States Patent
Shi (10) Patent No.: US 11,115,905 B2
(45) Date of Patent: Sep. 7, 2021

(54) METHOD AND APPARATUS FOR PUBLISHING INFORMATION AT WIRELESS ROUTING DEVICE END

(71) Applicant: SHANGHAI SHANGWANG NETWORK TECHNOLOGY CO., LTD., Shanghai (CN)

(72) Inventor: Fanpan Shi, Shanghai (CN)

(73) Assignee: SHANGHAI SHANGWANG NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/727,381

(22) Filed: Dec. 26, 2019

(65) Prior Publication Data

US 2020/0137667 A1  Apr. 30, 2020

Related U.S. Application Data

(63) Continuation of application No. PCT/CN2018/089638, filed on Jun. 1, 2018.

(30) Foreign Application Priority Data

Jun. 26, 2017 (CN) .......................... 201710492805.6

(51) Int. Cl.
*H04W 48/10* (2009.01)
*H04W 84/12* (2009.01)
*H04W 88/08* (2009.01)
*H04W 4/06* (2009.01)

(52) U.S. Cl.
CPC ............ *H04W 48/10* (2013.01); *H04W 84/12* (2013.01); *H04W 88/08* (2013.01)

(58) Field of Classification Search
None
See application file for complete search history.

(56) References Cited

U.S. PATENT DOCUMENTS 8,127,331 B2 * 2/2012 Heilbron ............ H04N 21/2668
725/46
2017/0317877 A1 * 11/2017 Rajapakse ............... H04L 65/60

FOREIGN PATENT DOCUMENTS

| CN | 102946591 A | 2/2013 |
| CN | 105306413 A | 2/2016 |
| CN | 105357741 A | 2/2016 |
| CN | 107205229 A | 9/2017 |
| WO | 2015070744 A1 | 5/2015 |

* cited by examiner

*Primary Examiner* — Hong S Cho
(74) *Attorney, Agent, or Firm* — Bayramoglu Law Offices LLC (57) ABSTRACT

A method for publishing information at a wireless routing device end includes the following steps. An information release request message sent by the user equipment is received, wherein the information release request message includes at least one display content and a display time indication of each display content in at least one display content. Based on the display time indication, the identification information of the wireless access point provided by the wireless routing device is updated and broadcast according to the display content. A wireless routing device and user equipment each includes one or more processors and a storage device for storing one or more programs. When one or more programs are executed by the one or more processors, the one or more processors implement the method.

19 Claims, 4 Drawing Sheets

METHOD AND APPARATUS FOR PUBLISHING INFORMATION AT WIRELESS ROUTING DEVICE END

CROSS REFERENCE TO THE RELATED APPLICATIONS

This application is the continuation application of International Application No. PCT/CN2018/089638, filed on Jun. 1, 2018, which is based upon and claims priority to Chinese Patent Application No. 201710492805.6, filed on Jun. 26, 2017, the entire contents of which are incorporated herein by reference.

TECHNICAL FIELD

The present disclosure relates to the field of communication technology, in particular to a method and a device for publishing information on a wireless routing device end.

BACKGROUND

Wireless routing is a technology that connects terminals such as personal computers, handheld devices (such as mobile phones and tablets) wirelessly. A wireless routing device can function as a repeater and re-transmits broadband network signal, that is received from other wireless devices, to a nearby wireless network device such as a laptop, a mobile phone, a tablet, or other devices that support wireless routing.

A wireless routing device provides a wireless access point. The wireless access point may be identified by, for example, SSID (Service Set Identifier). SSID is generally broadcast by a wireless routing device, and any terminal can do a search for broadcast SSID through the build-in scanning function, thereby having the ability to connect to a wireless access point.

In the prior art, the modification of SSID includes the following steps: in the first step, a user logs on the wireless router management page through an authentication process; in the second step, the user inputs SSID information into the management page; in the third step, the user confirms the modification of SSID information and restart the router; in the fourth step, the restarted router broadcasts the new SSID entered by the user.

SUMMARY

The object of the present disclosure is to provide an improved method and apparatus for publishing information at a wireless routing device end to address the technical problems mentioned in the background above.

In the first aspect, an embodiment of the present disclosure provides a method for publishing information at a wireless routing device end, including: receiving an information release request message, wherein the information release request message includes at least one display content and a display time indication of each display content in at least one display content; and based on the display time indication, updating and broadcasting identification information of the wireless access point provided by the wireless routing device according to the display content.

In some embodiments, the identification information of the wireless access point provided by the wireless routing device is updated and broadcast based on the display time indication according to the display content, which includes: a display queue is generated or updated based on the display time indication; and the identification information of the wireless access point provided by the wireless routing device is updated and broadcast according to the display queue.

In some embodiments, the method further includes: receiving a new information release request message sent by the user equipment, wherein the new information release request message includes at least one new display content and a display time indication of at least one new display content; the display queue based on the display time indication is generated or updated, which includes: the display queue is updated based on at least one new display content and display time information of at least one new display content.

In some embodiments, the display time indication includes display time information, and based on the display time indication of each display content, the identification information of the wireless access point provided by the wireless routing device is updated and broadcast according to the display content, which includes: when the present time reaches a start time point of a display content in at least one display content indicated by the display time indication, the identification information of the wireless access point provided by the wireless routing device is updated and broadcast according to the display content.

In some embodiments, based on the display time indication, the identification information of a wireless access point provided by a wireless routing device is updated and broadcast according to the display content, which includes: when the present time reaches an end time point of the display content in at least one display content indicated by the display time indication, the identification information is updated to be a default value.

In some embodiments, the display time indication includes display ordering. Based on the display time indication, the identification information of a wireless access point provided by the wireless routing device is updated and broadcast according to the display content which includes: the identification information of the wireless access point provided by the wireless routing device is updated and broadcast based on the display content according to the order indicated by the display ordering and in combination with a preset display ordering rule, wherein the display ordering includes a rule for determining the display time of the display content based on the display ordering of the display content.

In some embodiments, the method further includes: receiving a revocation release request message, wherein the revocation release request message is used for indicating the revocation of at least one display content; and deleting one or more display contents from at least one display content according to the revocation release request message.

In some embodiments, the method further includes: if one or more display contents including the display content currently in the display state are deleted, updating the identification information to be the default value.

In the second aspect, the present disclosure provides a method for publishing information at a user equipment end, the method including: receiving at least one display content provided by the user; generating an information release request message based on at least one display content, wherein the information release request message includes at least one display content and the display time indication of each display content in at least one display content; and sending the information release request message.

In some embodiments, the information release request message generated based on at least one display content includes: an information release request generated based on at least one display content and the display ordering of at least one display content.

In some embodiments, the user also provides a display time, and the information release request message generated based on at least one display content includes: an information release request generated based on at least one display content and the display time of each display content in at least one display content.

In some embodiments, the method further includes: displaying a list of wireless routing devices for the users to select from; in response to user's detected selection of the wireless routing device, and sending the information release request message to the selected wireless routing device.

In some embodiments, the method includes: displaying the released display content for the user to select as the display content to be revoked; in response to a detected user operation of selecting the revoked display content, searching a wireless routing device corresponding to the selected revoked display content; based on the selected display content to be revoked, generating the revocation release request message; and sending the revocation release request message to the searched wireless routing device.

In a third aspect, the present disclosure provides a wireless routing device including: one or more processors and a storage device for storing one or more programs, wherein when one or more programs are executed by one or more processors, one or more processors implement a method as disclosed in the first aspect above.

In a fourth aspect, the present disclosure provides user equipment including: one or more processors and a storage device for storing one or more programs. When one or more programs are executed by one or more processors, the one or more processors implement a method such as described in the second aspect above.

In a fifth aspect, the present disclosure provides a computer readable storage medium on which a computer program is stored, wherein the program is implemented as a method of any of the first aspects when executed by a processor.

In a sixth aspect, the present disclosure provides a computer readable storage medium on which a computer program is stored, and the computer program is implemented as a method of the second aspect when executed by a processor.

The method and the device used for publishing information at the wireless routing device end are provided by the embodiments of the present disclosure, and the function of information publication through the existing wireless routing device is realized by modifying the identification information of the wireless access point to the display content, thereby facilitating and simplifying the information distribution.

BRIEF DESCRIPTION OF DRAWINGS

Other features, purposes and advantages of the present disclosure will be clearly illustrated by the following drawings with reference to the detailed descriptions of the non-restrictive embodiments.

DETAILED DESCRIPTION OF EMBODIMENTS

The present disclosure is further described in detail in combination with the drawings and embodiments hereinafter. It is understandable that the particular embodiment described herein is merely intended to interpret the relevant present disclosure rather than to limit the present disclosure. It is also necessary to note that, for the convenience of description, only the parts relating to the present disclosure are shown in the drawings.

It is noted that, the features of the embodiments in the present disclosure may be combined with each other provided that there is no conflict. The present disclosure is described in detail with reference to the drawings and the embodiments.

Figure 1:
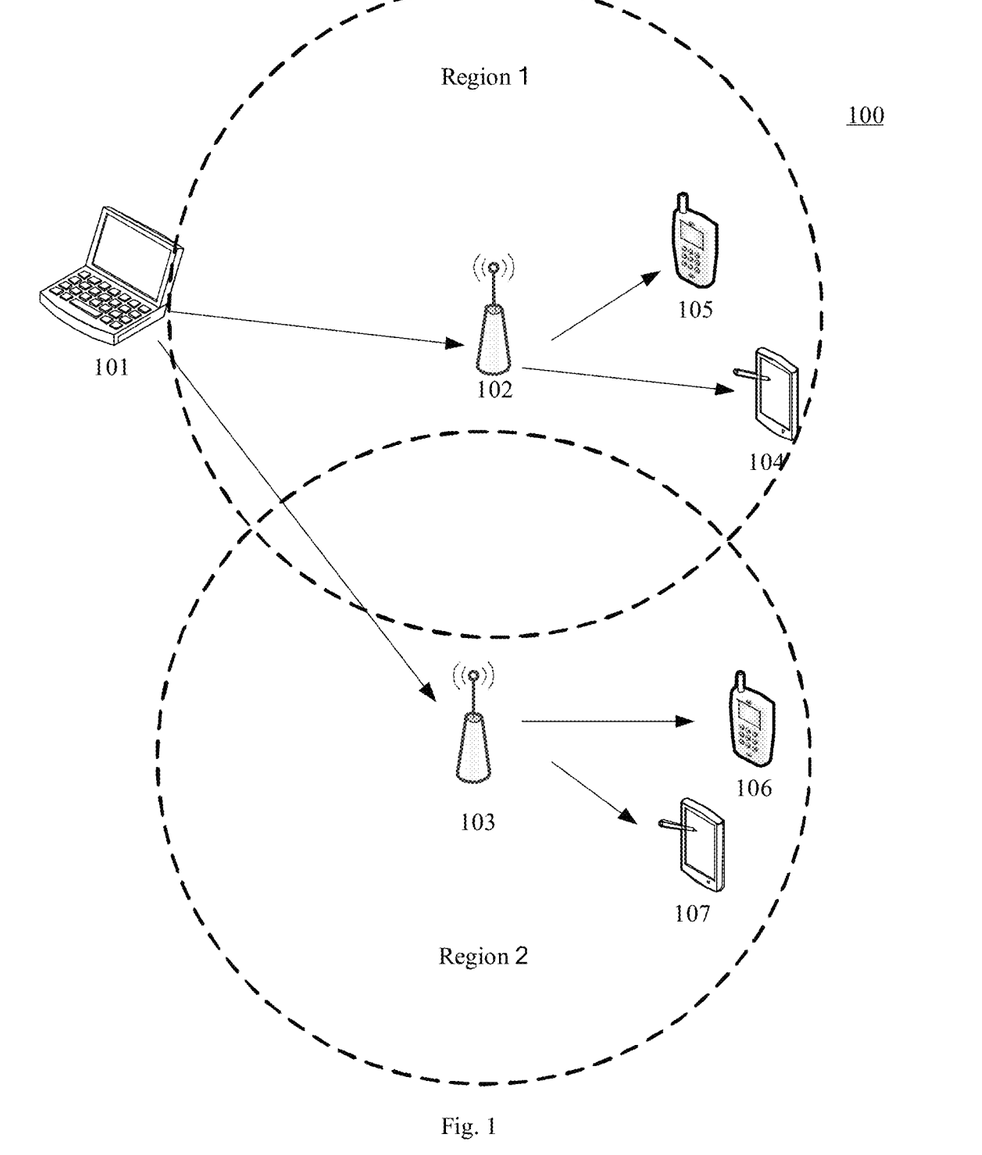
FIG. 1 is an exemplary system architecture diagram applied by the present disclosure.

FIG. 1 shows the exemplary system architecture 100 of an embodiment of a method for publishing information at a wireless routing device end or an apparatus for publishing information at a wireless routing device end that can apply to the present disclosure.

As shown in FIG. 1, the system architecture 100 may include the user equipment 101, the wireless routing devices 102, 103, and the receiving terminal devices 104, 105, 106, 107. The user equipment 101, the wireless routing devices 102, 103, and the receiving terminal devices 104, 105, 106, 107 are connected wirelessly.

The user can use the user equipment 101 to interact with the receiving terminal devices 104,105, 106, 107, for example, to send and receive messages, etc. Various communication client applications, such as web browser applications, shopping applications, search class applications, instant messaging tools, mailbox clients, social platform software, and the like, may be installed on the user equipment 101.

The user equipment 101 and the receiving terminal devices 104, 105, 106, 107 may be various electronic devices having a display screen and supporting wireless connections, including but not limited to smartphones, tablets, e-bookreaders, MP3 players (Moving Picture Experts Group AudioLayer III), MP4 players (Moving Picture Experts Group Audio Layer IV), laptop computers and desktop computers, etc.

The wireless routing devices 102, 103 may be a wireless routing device providing various services, such as a back-end wireless routing device providing support for SSID displayed on the receiving terminal devices 104, 105,106, 107. The back-end wireless routing device may analyze and process data such as the received display content transmitted by the user equipment 101, and broadcast the processing results (e.g. SSID) to the receiving terminal devices 104, 105,106, 107. The broadcasting of the wireless routing devices 102, 103 covers the receiving terminal devices in regions 1 and 2, respectively.

The method provided by the embodiment of the present disclosure for publishing information at the wireless routing device end is generally performed by the user equipment 101 and the wireless routing devices 102, 103, and accordingly, the device for publishing information at the wireless routing device end is generally provided in the user equipment 101 and the wireless routing devices 102, 103.

It should be understood that the number of user equipment, receiving terminal devices, and wireless routing devices in FIG. 1 is merely exemplary. According to the practical requirement, the present disclosure can have any number of user equipment, receiving terminal devices and wireless routing devices.

Figure 2:
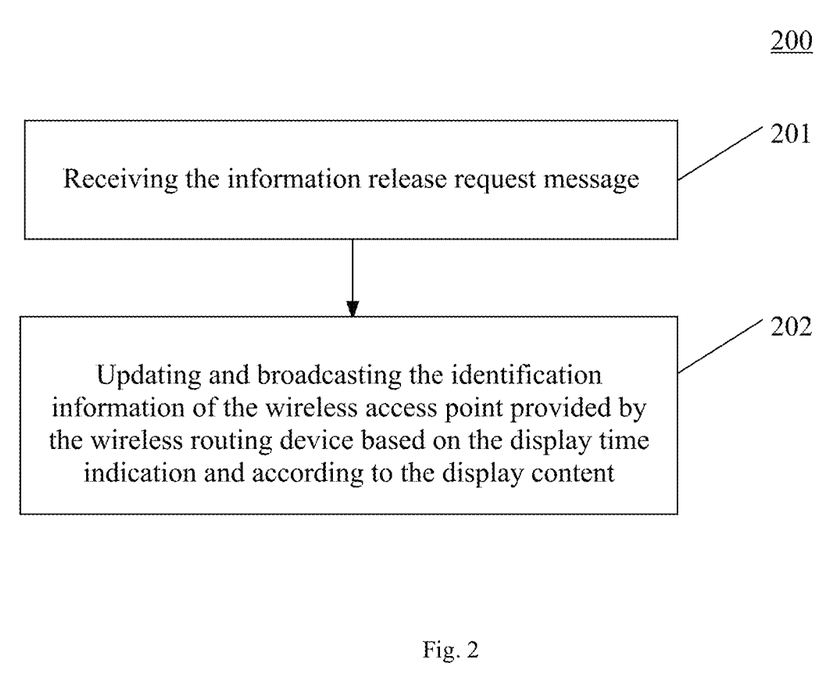
FIG. 2 is a flow chart of one embodiment of the method for publishing information at a wireless routing device end according to the present disclosure.

FIG. 2 shows the flow chart 200 of an embodiment of the method for publishing information at the wireless routing device end according to the present disclosure. The method for publishing information at the wireless routing device end includes the following steps:

Step 201: receiving an information release request message.

The information release request message may be from user equipment or a network device. The network device includes, but is not limited to, servers such as cloud servers. Further, the information release request message sent by the network device can be from the user equipment or generated by the network device.

In this embodiment, an electronic device (e.g., the wireless routing device as shown in FIG. 1) may receive the information release request message from a terminal used by a user for information release in a manner of wired or wireless connection. Specifically, the information release request message includes at least one display content and the display time indication of each display content in at least one display content; wherein, the display time indication can be independent of the display content, or can be included in the display content. For example, the display content is "1:00 p.m.; members of the project A attend a conference in Conference Room I", wherein "1:00 p.m." is part of the display content and also the display time indication; alternatively, the information release request message includes the display content "Members of the project A attend a conference in Conference Room I" and the display time instruction "1:00 p.m." independent of the display content. The display time indication can be a specific time period, a start time point, or the display ordering. For example, the display content is "1, members of the project A attend a conference in Conference Room I." And "2, members of the project B attend a conference in Conference Room II.", wherein, "1" and "2" are the display ordering. The serial number can be displayed in sequence from small to large, or in sequence from large to small. For example, the display content includes "Members of the project A attend a conference in Conference Room I" and "Members of the project B attend a conference in Conference Room II", and the display ordering includes the first ordering of "Members of the project A attend a conference in Conference Room I" and the second ordering of "Members of the project B attend a conference in Conference Room IT". If a plurality of display contents in the information release request message are sequenced in order, the order of the plurality of display contents represents the display ordering of the plurality of display contents, and no additional information is required to indicate the display ordering of the plurality of display contents. For example, if the display content is preset to be separated by "I" and the display content obtained from the information release request message is expressed as "KFC discount/McDonald discount", it is determined based on "I" that two display contents "KFC discount" and "McDonald discount" are included in the information release request message, and it is determined that the 'KFC discount' is sequenced before the "McDonald discount".

After receiving the display content, the user can be authenticated. Only the user with the publishing permission can publish information through the wireless routing device.

Step 202: based on the display time indication, updating and broadcasting the identification information of the wireless access point provided by the wireless routing device according to the display content.

In this embodiment, the identification information of the wireless access point of the wireless routing device, such as SSID, can be updated and broadcast according to the display content and in combination with a specific display time or display ordering.

In some embodiments, identification information of a wireless access point can be directly updated to be the display content. For example, the display content is "13:00; members of the project A attend a conference in Conference Room I", and the display time indication includes a display time period of "12:00-13:00", the SSID can be updated to be "13:00; members of the project A attend a conference in Conference Room I" within a time period of 12:00-13:00.

In some embodiments, the display content may be adjusted according to predetermined rules and the identification information of the wireless access point may be updated to be the adjusted display content.

For example, the information used for identifying the geographic location of the wireless routing device may be added to the SSID based on a preset geographic location of the wireless routing device. If the location of the wireless routing device is preset as "Room 301", and the display content is "1:00 p.m.; members of the project A attend a conference in Conference Room I", then SSID can be updated to be "Room 301, 1:00 p.m.: members of the project A attend a conference in Conference Room I", according to the display content and the preset geographical location; also, if the geographical location of the wireless routing device is preset as "first floor KFC," the display time is indicated as "14:00-16:00," and the display content is "the original recipe fried chicken with 20% off", then the SSID can be changed to "first floor KFC, the original recipe fried chicken," in the time period from 14:00 to 16:00.

Also, for example, the display content may be semantically recognized to extract the display time indications in the display content and then update the SSID.

In some embodiments, the display content may also be edited according to the display time indication and the current time point, and the identification information of the wireless access point may be updated to be the edited display content. For example, the display content is "Having a meeting in Room 301 in one hour," the wireless routing device can calculate the exact time based on the current time of one o'clock in the afternoon, and then update the SSID to "Having a meeting in Room 301 at two o'clock in the afternoon."

In the case that the display content contains a display time indication, in some embodiments, the display time indication may be extracted from the display content according to a preset format rule. If the display content before the punctuation ":" is specified as the display time indication, then the display content before ":" is extracted as the display time indication accordingly. In some embodiments, keywords can also be extracted from the display content by using a natural language processing method, and the display content can be edited in combination with information such as current time and location. For example, after extracting the relative time keyword such as "half hour later" and "tomorrow", the relative time keyword is converted into absolute time. After extracting the keywords of the relative location such as "upstairs", "downstairs" and "next door", the keywords are converted into the absolute location such as "xx floor" and "xx room".

In some optional implementations of this embodiment, the above-mentioned step 202 includes: generating or updating the display queue based on the display time indication; updating and broadcasting the identification information of the wireless access point provided by the wireless routing device according to the display queue. The step of generating or updating may include a process of sorting. For example, the display content is "1:00; members of the project A attend a conference in Conference Room I" and "2.00; members of the project B attend a conference in Conference Room II", which can be sorted by time "1:00" and "2:00", and the identification information of the wireless access point is first updated as "1:00; members of the project A attend a conference in Conference Room I" and then the identification information for the wireless access point is updated as "2:00; members of the project B attend a conference in Conference Room II".

In some optional implementations of this embodiment, the method of the embodiment further includes: receiving a new information release request message sent by the user equipment, and the new information release request message includes at least one new display content and the display time information of the at least one new display content; the above-mentioned step 202 includes: updating the display queue according to at least one new display content and the display time information of at least one new display content and in combination with the display time indication of at least one display content; and updating and broadcasting the identification information of the wireless access point provided by the wireless routing device based on the updated display queue.

In some embodiments, if the display time of the new display content conflicts with the display time of the original display content, the display time of the new display content is used to cover the display time of the original display content, namely, the display time of the original display content is adjusted correspondingly; if the display time of the original display content is completely covered by the display time of the new display content, the original display content is deleted. For example, if the display time of the previously received display content A is 11:00-13:00 and the display time of the newly received display content B is 10:00-14:00, the display time of the display content A is covered by the display content B, and the display content A and the display time thereof are deleted. If the display time of the previously received display content A is 11:00-13:00 and the display time of the newly received display content B is 11:00-12:00, the display time of the display content A is adjusted to 12:00-13:00.

In some embodiments, if the display time of the new display content conflicts with the display time of the original display content, the display queue may be further updated in combination with the priority of the user who sends the information release request message. Typically, in the presence of a conflict, the display queue is updated based on display contents and display time indications contained in the display request message provided by a higher priority user.

In some optional implementations of this embodiment, the display time indication includes display time information, and the above-mentioned step S202 includes: when the present time reaches a start time point of a display content in at least one display content indicated by the display time indication, updating and broadcasting the identification information of the wireless access point provided by the wireless routing device according to the display content. The display time information may include a start time point. In some embodiments, the display time information may also include an endpoint in time. The start time point and/or end time point can be identified by a predetermined keyword such as "start" and "end"; the start time point or end time point can also be analyzed according to the semantics. Alternatively, a start time point and/or an end time point are determined by predetermined special characters. For example, a start time point "14:00" and an end time point "16:00" are identified based on"14:00-16:00" conforming to the fixed format "XX:XX-XX:XX", where "X" represents any number in 0-9. When the starting point is reached, the identification information is updated based on the display content. In some embodiments, the identification information is directly modified to display content. In some embodiments, the display content may be adjusted according to predetermined rules, and the identification information of the wireless access point is updated to the adjusted display content.

In some optional implementations of this embodiment, the above-mentioned step 202 includes: when the present time reaches the end time point of the display content in at least one display content indicated by the display time indication, updating the identification information of the wireless access point to be the default value. By means of this implementation, if the released information exceeds the time limit, the identification information can be restored to the default setting. For example, the default value of the identification information of the wireless access point is "Shop C", based on the display content "KFC discount" and the display time information "14:00-16:00", the identification information is modified to "KFC discount" at 14:00, then the current time reaches 16:00, and the identification information is restored to the default value "Shop C". It needs to be noted that in some embodiments, the display time information may include only a start time point in time, but not an end time point in time or an end time indication.

In some optional implementations of this embodiment, the display time indication includes the display ordering, and the above-mentioned step 202 includes: updating and broadcasting the identification information of the wireless access point provided by the wireless routing device based on the display content according to the order of the display ordering indication and in combination with a preset display ordering rule, wherein the display ordering rule includes a rule for determining the display time of the display content based on the display ordering of the display content. In some embodiments, the preset ordering display rules include, but are not limited to: 1) The rule that the identification information of the wireless access point is updated at a predetermined time interval based on the ordering of a plurality of display contents. For example, if the predetermined time interval is 2 hours, and the display content is X, display content Y and display content Z are obtained, then the SSID is updated based on the display content X, the SSID is updated based on the display content Y after 2 hours, the SSID is updated based on the display content Z after 2 hours, and SSID is updated based on the display content X, thereby circulating in that manner. 2) A rule specifying a mapping relationship between the ordering of display content and the display time of display content. For example, a start time point of display content of the first ordering is specified to be 10:00, a start time point of display content of the second ordering is specified to be 12:00, a display time period of display content of the third ordering is specified to be 14:00-16:00, and the like.

In some optional implementations of this embodiment, the method further includes: receiving the message of the revocation release request. The revocation release request message is used for indicating the revocation of at least one display content. One or more display contents are deleted from at least one display content according to the revocation release request message. The revocation release request message may be from the user equipment or the network device.

The revocation release request message may include specific display content, or may include only display ordering of display content that needs to be deleted, for example, deleting the display content having the order of 1. In some cases, such as in a scenario where the display time indication includes a display ordering, the display time of the display content is adjusted accordingly after the display content is deleted. For example, the display content having the order of 2 is deleted, and then the display content having the order of 3 is displayed directly after the display content having the order of 1 is displayed, that is, the display content ordered after the deleted display content is displayed in advance.

In some optional implementations of this embodiment, the method further includes: if one or more display contents including the display content currently in the display state are deleted, the identification information is updated to be the default value. For example, when the user deletes a content that is being displayed, the identification information is temporarily updated to be the default value until reaching the next display time for the content.

In this embodiment, a wireless routing device generally provides a function of allowing SSID broadcast. If the user wants his/her own wireless network to be searched by someone else through the SSID name, the user should "enable SSID broadcast", and then, the wireless network appears in the list of available networks that others have discovered. For example, other users can see the WiFi list through a terminal with WiFi functionality and then see the SSID name, which is essentially released information.

In some embodiments, the steps 202 may be repeatedly performed after one step 201 is performed.

Figure 3:
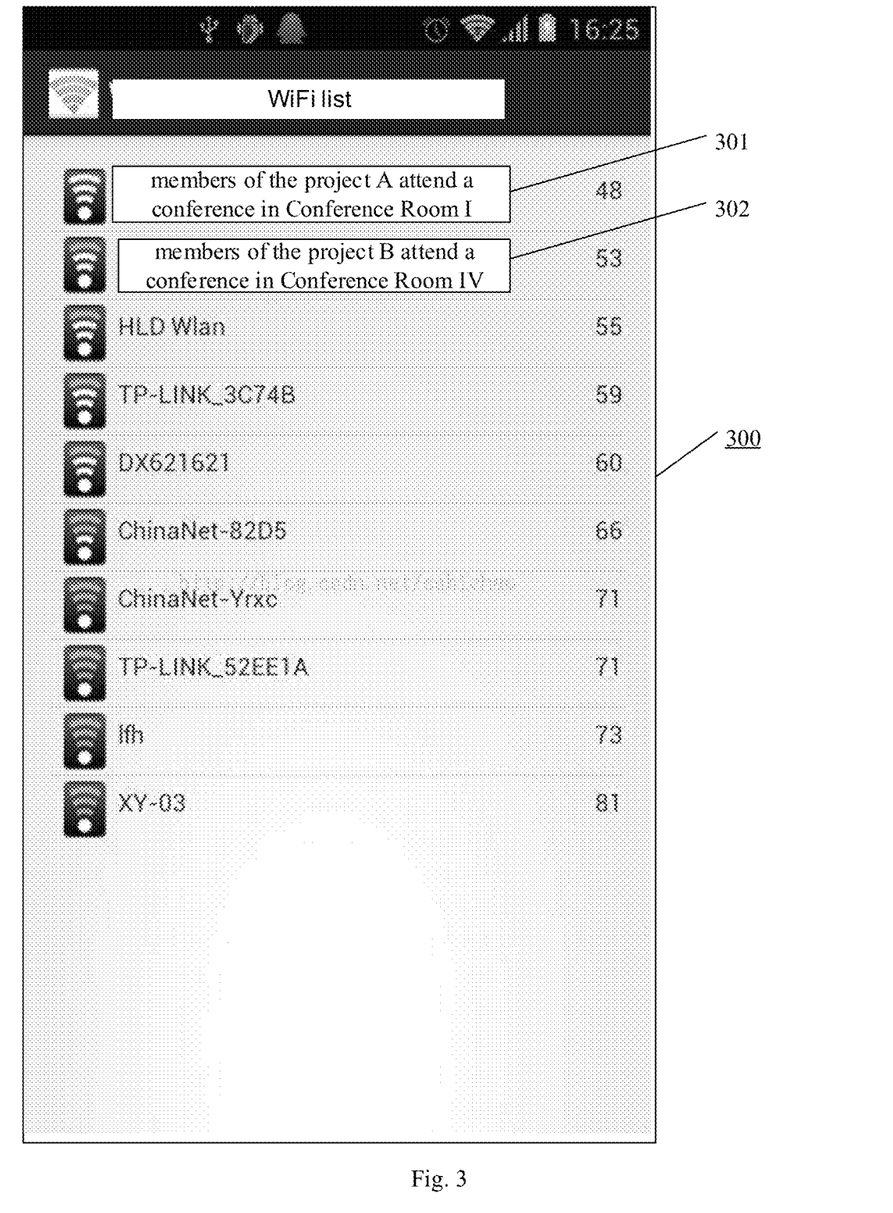
FIG. 3 is a schematic diagram of an application scenario of the method for publishing information at the wireless routing device end according to the present disclosure.

As shown in FIG. 3, FIG. 3 is a schematic diagram of the application scenario of the method for publishing information at the wireless routing device end according to this embodiment. In an application scenario in FIG. 3, a user employs a user terminal to transmit a first display content "Members of Group A attend a meeting at 1:00 p.m. in Conference Room I" and its start time point of 12:00 to the first wireless routing device, and transmit a second display content "Members of Group B attend a meeting at 1:00 p.m. in Conference Room IV" and its start time point of 12:00 to the second wireless routing device through. At 12:00, the first wireless routing device modifies the SSID of the first wireless routing device to "Members of Group A attend a meeting at 1:00 p.m. in Conference Room I", and the second wireless routing device modifies the SSID of the second wireless routing device to "Members of Group B attend a meeting at 1:00 p.m. in Conference Room IV". The first wireless routing device and the second wireless routing device broadcast respective SSIDs, and when the terminal device 300 is simultaneously located within the coverage area of the wireless access point provided by the first wireless routing device and the second wireless routing device, the first display content "Members of Group A attend a meeting at 1:00 p.m. in Conference Room I" and the second display content "Members of Group B attend a meeting at 1:00 p.m. in Conference Room IV".

The method provided by the embodiment of the present disclosure facilitates information release by modifying the identification information of the wireless access point of the wireless routing device to the content related to the display content.

Figure 4:
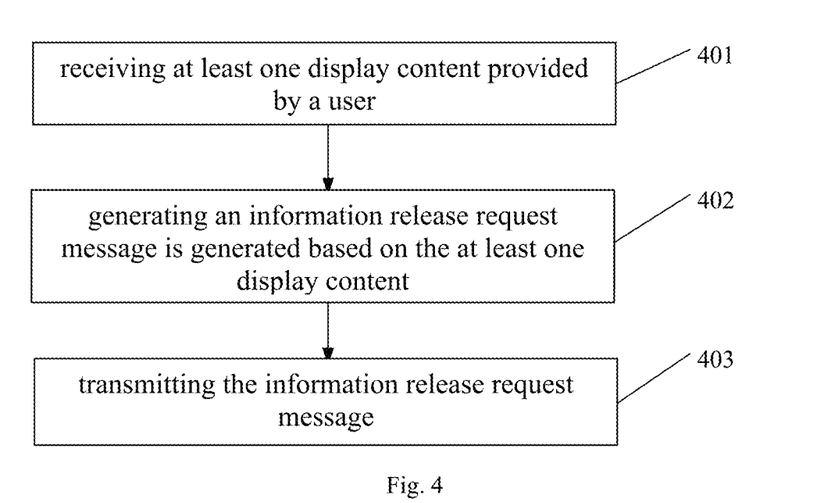
FIG. 4 is a flow chart of one embodiment of the method for publishing information at the user equipment end according to the present disclosure.

FIG. 4 shows a process 400 of one embodiment of a method for publishing information at the user equipment end. The process 400 of the method for publishing information at the user equipment end includes the following steps:

Step 401: receiving at least one display content provided by a user.

In this embodiment, an electronic device (e.g., the user equipment shown in FIG. 1) may receive at least one display content input by the user, and may also extract at least one display content from a file provided by the user. In some embodiments, the display content may be ordered in the time order entered by the user, and the ordering may be adjusted by the user. In some embodiments, the user equipment may provide a plurality of ordered input boxes in the interface so that the user can input a display content within an input box.

Step 402: generating an information release request message based on at least one display content.

In this embodiment, the information release request message includes at least one display content and a display time indication of each display content in the at least one display content. The display time indication may include the specific display time, or may include the display ordering.

In some optional implementations of this embodiment, the step 402 includes: generating an information release request message based on at least one display content and the display ordering of the at least one display content. For example, if the user enters a "KFC discount" in an input box having the order of 1 and enters a "McDonald discount" in an input box having the order of 2, the generated information release request message may include a "KFC discount/ McDonald discount", the information release request message includes display contents "KFC discount" and "McDonald discount", and the time order of the two display contents indicates the display ordering of the two display contents; wherein, the punctuation "I" is used to separate two display contents.

In some optional implementations of this embodiment, the user also provides the display time, the step 402 includes: generating an information release request message based on at least one display content and the display time of each display content in the at least one display content. For example, the user equipment shows a first input box, a second input box, a third input box and a fourth input box in the interface, wherein, the second input box is used for inputting the display content, the first input box is used for inputting the display time information of the display content in the second input box, the fourth input box is used for inputting the display content, and the third input box is used for inputting the display time information of the display content in the fourth input box. If the user enters"10:00-12:00" in the first input box, enters "KFC discount" in the second input box, enters "14:00-16:00" in the third input box, and enters "McDonald discount" in the fourth input box, then the user equipment generates the information release request message "[10:00-12:00; KFC discount]; [14:00-16:00; McDonalds discount]" according to the user input content. The information release request message includes the display content "KFC Discount" and its display time information "10:00-12:00", and the display content "McDonald Discount" and its display time information"14:00-16:00". The punctuations such as ";", "[" and "]" in the information release request message are generated according to predetermined rules so that the user equipment, the wireless routing device or the network device can identify the display content and the display time information corresponding to display content.

Step 403: sending the information release request message.

The information release request message can be sent to the wireless routing device; alternatively, it can be sent to a network device and then sent to a wireless routing device by the network device.

In this embodiment, the information release request message is preset to be sent to any one of wireless routing devices. The user terminal can also automatically obtain the display content received by each wireless routing device, detects whether there is time conflict, and send the display content to the wireless routing device without time conflict, namely, a spare wireless routing device during the display time is found for transmission.

In some optional implementations of this embodiment, the method further includes: displaying a list of wireless routing devices for users to select; in response to a detected user's selection operation for the wireless routing device, sending the information release request message to the selected wireless routing device. This implementation is used for a user to send display content to the selected wireless routing device.

In some optional implementations of this embodiment, the method includes: displaying the released display content for the user to select as the display content to be revoked; in response to the detected user's selection operation of the display content to be revoked, searching the wireless routing device corresponding to the selected revoked display content; based on the selected display content to be revoked, generating a revocation release request message; sending the revocation publish request message to the searched wireless routing device. The implementation method can automatically find which wireless routing device displays the content to be revoked and send the revocation release request message to this wireless routing device without the user selecting the wireless routing device, which only needs to know the content to be revoked. The user can also select the wireless routing device by himself, and the user terminal displays the content displayed on each wireless routing device, and then the user only needs to do the selection operation to generate the release request message.

In the embodiment, the user equipment end can release information and cancel information. Therefore, the present disclosure can ensure that the information needed to be released by the user can be released and canceled in time.

Figure 5:
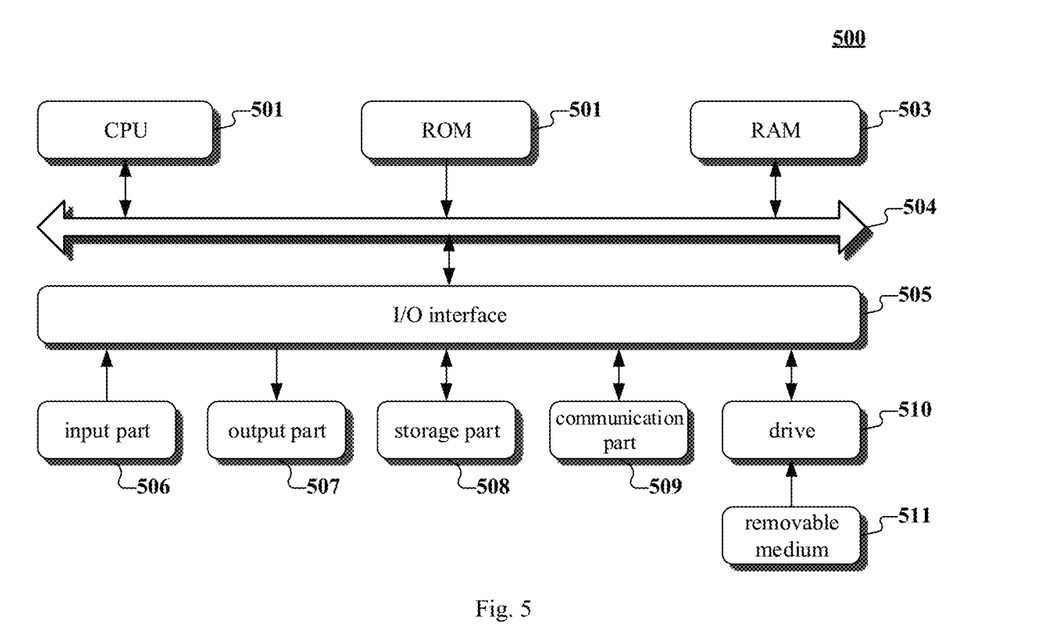
FIG. 5 is a block diagram showing a computer system of a wireless routing device and user equipment of the embodiment of the present disclosure.

FIG. 5 shows the structural diagram of the computer system 500 adapted to implement a wireless routing device and the user equipment according to the present embodiment. The wireless routing device and user equipment shown in FIG. 5 are only exemplary and should not impose any restrictions on the functionality and scope of use of the present embodiments.

As shown in FIG. 5, the computer system 500 includes the central processing unit (CPU) 501 capable of performing various appropriate actions and processes according to a program stored in the read-only memory (ROM) 502 or a program loaded from the storage section 508 into the random access memory (RAM) 503. In RAM 503, various programs and data required for operating in the computer system 500 are also stored. The CPU 501, the ROM 502, and the RAM 503 are connected to each other via the bus 504. The input/output (I/O) interface 505 is also connected to the bus 504.

The following parts connect to the I/O interface 505, including the input part 506, the output part 507, the storage part such as a hard disk, and the communication part 509 of a network interface card such as a LAN card, and a modem. The communication part 509 performs communication processing via a network such as the Internet. The drive 510 is also connected to I/O interface 505 as needed. The removable medium 511, such as a disk, an optical disk, a magnetic disk, and a semiconductor memory, is mounted on the driver 510 as needed to facilitate the installation of a computer program from the removable medium 511 on the storage part 508 as required.

In particular, according to embodiments of the present disclosure, the process described in the flow chart above for reference may be implemented as a computer software program. For example, in an embodiment of the present disclosure, a computer program product includes a computer program in a computer readable medium, and the computer program includes program codes for executing a method shown in a flow chart. In such an embodiment, the computer program may be downloaded from the network via the communication section 509 and then and installed, and/or installed from the removable medium 511. When the computer program is executed by the central processing unit (CPU) 501, the functions defined in the method of the present disclosure are executed. It is noted that the computer-readable medium described herein may be a computer-readable signal medium or a computer-readable storage medium or any combination thereof. The computer-readable storage medium includes, but is not limited to, an electrical, magnetic, optical, electromagnetic, infrared, or semiconductor system, device, or component, or any combination thereof. Specifically, the computer-readable storage medium may include, but is not limited to: an electrical connection having one or more conductors, a portable computer disk, a hard disk, a random access memory (RAM), a read only memory (ROM), a erasable programmable read only memory (EPROM or flash), an optical fiber, a portable compact disk read only memory (CD-ROM), an optical memory device, a magnetic memory device, or any proper combination thereof. In the present disclosure, the computer-readable storage medium may be any tangible medium containing or storing a program that may be used by an instruction execution system, apparatus or device or in combination therewith. In this present disclosure, a computer readable signal medium may include data signals propagating in a baseband or as part of a carrier, wherein the computer readable program code is carried in the computer readable signal medium. Such transmitted data signals may take multiple forms, including but not limited to electromagnetic signals, optical signals or any proper combination of the above signals. The computer-readable signal medium may also be any computer-readable medium other than the computer-readable storage medium, the computer-readable medium may send, propagate, or transmit the programs used by, or in combination with, instruction execution systems, components, or devices. The program code contained on a computer-readable medium may be transmitted on any appropriate medium, including but not limited to: wireless, wired, optical cable, RF, or any proper combination thereof.

The flow chart and block diagram in the drawings illustrate possible architectures, functions and operations of systems, methods and computer program products in accordance with various embodiments of the present disclosure. In this regard, each box in the flow chart or block diagram may represent a module, program segment, or part of a code that contains one or more executable instructions for implementing a preset logical function. It should also be noted that in some replaceable implementations, the functions labeled in the box can also be executed in a different order than those labeled in the diagram. For example, two contiguous boxes can actually be executed simultaneously or conversely, depending on the involved function. It is also important to note that each box or the combination of each box in the block diagram and/or the flow chart can be implemented with a dedicated hardware-based system that performs preset functions or operations, or with a combination of dedicated hardware and computer instructions.

In another aspect, the present disclosure also provides a computer readable medium that may be included in a wireless routing device described in the above embodiment; or is an individual device that is not assembled in the wireless routing device. The computer-readable medium carries one or more programs. When one or more programs are executed by the wireless routing device, the wireless routing device is configured to receive the information release request message sent by the user equipment, wherein the information release request message includes at least one display content and a display time indication of each display content in the at least one display content; based on the display time indication, to update and broadcast identification information of the wireless access point provided by the wireless routing device according to the display content.

In another aspect, the present disclosure also provides a computer readable medium that may be included in the user equipment described in the above embodiment; or is an individual device that is not assembled in the user equipment. The computer-readable medium carries one or more programs. When one or more programs are executed by the user equipment, the user equipment is configured to receive at least one display content provided by the user; to generate an information release request message based on at least one display content, wherein the information release request message including at least one display content and the display time indication of each display content in at least one display content; and to send the information release request message to the wireless routing device.

The above description is only preferred embodiments of the present disclosure and an explanation of the technical principles used by the present disclosure. A skilled person in the field shall understand that the scope involved in the present disclosure is not limited to the technical solution formed by the specific combination of the technical characteristics mentioned above, but shall also cover other technical solutions formed by the arbitrary combination of the technical characteristics or the equivalent characteristics thereof without departing from the inventive concept, such as the technical solution formed by replacing the above features with the technical features having similar functions disclosed in the present disclosure.

What is claimed is:

1. A method for publishing information at a wireless routing device end, comprising:
   receiving an information release request message, wherein the information release request message comprises at least one display content and a display time indication of each display content in the at least one display content; and
   updating and broadcasting identification information of a wireless access point provided by the wireless routing device based on the display time indication and according to the display content.

2. The method according to claim 1, wherein, the step of updating and broadcasting the identification information of the wireless access point provided by the wireless routing device based on the display time indication and according to the display content comprises:
   generating or updating a display queue based on the display time indication;
   updating and broadcasting the identification information of the wireless access point provided by the wireless routing device according to the display queue.

3. The method according to claim 2, further comprising:
   receiving a new information release request message sent by user equipment, wherein the new information release request message comprises at least one new display content and display time information of the at least one new display content;
   the step of generating or updating the display queue based on the display time indication comprises:
   updating the display queue according to at least the one new display content and the display time indication of the at least one new display content and in conjunction with the display time indication of at least one display content.

4. The method according to claim 3, further comprising:
   receiving a revocation release request message, wherein the revocation release request message is configured for indicating revocation of at least one display content; and
   deleting one or more display contents from the at least one display content according to the revocation release request message.

5. The method according to claim 2, further comprising:
   receiving a revocation release request message, wherein the revocation release request message is configured for indicating revocation of at least one display content; and
   deleting one or more display contents from the at least one display content according to the revocation release request message.

6. The method according to claim 1, wherein, the display time indication includes display time information, and
   the step of updating and broadcasting the identification information of the wireless access point provided by the wireless routing device based on the display time indication of the each display content and according to the display content comprises:
   updating and broadcasting the identification information of the wireless access point provided by the wireless routing device according to the display content when a start time point, indicated by the display time indication, of the one display content of at least one display content is reached.

7. The method according to claim 6, wherein, the step of updating and broadcasting the identification information of the wireless access point provided by the wireless routing device according to the display content based on the display time indication comprises:
   updating the identification information to be a default value when an end time point, indicated by the display time indication, of the one display content of at least one display content is reached.

8. The method according to claim 6, further comprising:
   receiving a revocation release request message, wherein the revocation release request message is configured for indicating revocation of at least one display content; and
   deleting one or more display contents from the at least one display content according to the revocation release request message.

9. The method according to claim 1, wherein, the display time indication comprises a display ordering, and the step of updating and broadcasting the identification information of the wireless access point provided by the wireless routing device based on the display time indication and according to the display content comprises:

updating and broadcasting the identification information of the wireless access point provided by the wireless routing device based on the display content and according to an order indicated by the display ordering in combination with a preset ordering display rule, wherein the ordering display rule includes a rule for determining display time of the display content based on the display ordering of the display content.

10. The method according to claim 1, further comprising:

receiving a revocation release request message, wherein the revocation release request message is configured for indicating revocation of at least one display content; and deleting one or more display contents from the at least one display content according to the revocation release request message.

11. The method according to claim 10, further comprising:

updating the identification information to be a default value when the one or more display contents include the display contents being displayed and are deleted.

12. A method for releasing information at a user equipment end, comprising:

receiving at least one display content provided by a user;

generating an information release request message based on the at least one display content, wherein the information release request message comprises the at least one display content and a display time indication of each display content in the at least one display content;

transmitting the information release request message;

displaying a released display content for the user to select as a display content to be revoked;

detecting a selection operation of the user for the display content to be revoked;

searching a wireless routing device corresponding to a selected display content to be revoked;

generating a revocation release request message based on the selected display content to be revoked, and sending the revocation release request message to the wireless routing device corresponding to the selected display content to be revoked.

13. The method according to claim 12, wherein, the step of generating the information release request message based on the at least one display content comprises:

generating the information release request message based on the at least one display content and a display ordering of the at least one display content.

14. The method according to claim 12, wherein the user provides a display time, and the step of generating the information release request message based on the at least one display content comprises:

generating the information release request message based on the at least one display content and the display time of each display content in the at least one display content.

15. The method according to claim 12, further comprising:

displaying a list of wireless routing devices for the user to select from;

detecting a selection operation of the user for a selected wireless routing device; and sending the information release request message to the selected wireless routing device.

16. A wireless routing device, comprising:

one or more processors; and a storage device for storing one or more programs, wherein when one or more programs are executed by the one or more processors, the one or more processors implement the method according to claim 1.

17. A user equipment, comprising:

one or more processors; and a storage device for storing one or more programs, wherein when one or more programs are executed by the one or more processors, the one or more processors implement the method according to claim 12.

18. A non-transitory computer-readable storage medium, storing a computer program, wherein, the program is executed by a processor to implement the method according to claim 1.

19. A non-transitory computer-readable storage medium, storing a computer program, wherein, the program is executed by a processor to implement the method according to claim 12.

* * * * *